Feb. 26, 1963    F. N. SINGDALE ET AL    3,079,575
RESISTANCE STRAIN GAGE AND METHOD FOR MAKING SAME
Filed Aug. 12, 1959

INVENTORS.
FRED N. SINGDALE
WALTER H. RIGHTER
BY R. E. Geangue
ATTORNEY

United States Patent Office 3,079,575
Patented Feb. 26, 1963

3,079,575
RESISTANCE STRAIN GAGE AND METHOD
FOR MAKING SAME
Fred N. Singdale, Arcadia, and Walter H. Righter, Glendale, Calif., assignors, by mesne assignments, to Lockheed Aircraft Corporation, Burbank, Calif., a corporation of California
Filed Aug. 12, 1959, Ser. No. 833,313
8 Claims. (Cl. 338—2)

This invention relates to resistance type electric strain gages, and in particular to an improved gage of this type and a method of making the same that is suitable for use at high temperatures. Resistance type electric strain gages are well known in the art and generally comprise an electrical conductive filament that is cemented to a structure subject to strain. The strain produces an elongation or a compression of the filament and thus changes its electrical resistance. In general, resistance type strain gages known today comprise a filament permanently bonded to a support member such as a sheet of paper, which remains a part of the gage after it is attached to the structure subject to strain, or a filament embedded in a block of bonding cement, with the entire block cemented to the structure subject to strain.

In use, the conventional gages are cemented to the structure subject to strain and since the supporting piece of paper remains a part of the gage, this type of gage is not suitable for use at temperatures which are even moderately high. Conventional gages made without the supporting paper are difficult to manufacture since each gage must be custom made at the time it is to be used.

The gage of the present invention avoids the above difficulties by obviating the necessity for a supporting member such as a sheet of paper, and the gage of the present invention can be made on a mass production scale and wherein the manufacture of the gage is relatively simple.

In the past it has been extremely difficult to install a resistance type electric strain gage because of the fact that the wire grids are relatively small, employing wire sizes less than a thousandth of an inch in diameter, and therefore extremely difficult to support, hold during the installation in the cement, and complete installation of the gage being uncertain as far as adherence of the cement to the structural member subject to strain is concerned.

Therefore, it is an object of the present invention to provide an improved method of making resistance type electric strain gages resulting in superior gages than are presently obtainable and which are especially suitable for high temperature work in that the supporting member on which the gage may be initially formed is used for handling purposes during the installation of the gage on a structural member and is removed from the gage during the curing process of the cement which couples the gage to the structural member.

Another object of the present invention is to provide an improved resistance type electric strain gage especially adapted for high temperature work which may be conveniently distributed as small prefabricated units, and from which the supporting member can be removed during the application of the gage to a structural member subject to strain during the curing process of the cement employed to secure the gage to the structural member.

Still a further object of the present invention is to provide an improved resistance type electric strain gage wherein the jig or fixture used to form the wire grid of the gage serves as a convenient means for supporting the gage during installation. A feature resides in the fact that the jig or fixture detaches from form blocks about which the wire grid is formed during the curing process of the cement in which the gage is embedded for installation or, if desired, detachment can be achieved by applying a solvent to the adhesive which bonds the blocks to the jig so that the bond is weakened and separation of the blocks from the jig easily accomplished by manual pressure.

Still a further object of the present invention is to provide a strain gage jig or fixture having form blocks about which the wire grid of the gage is formed which are detachable from the jig at a predetermined temperature so that the jig may be removed from the form block and the gage after embedding the gage in cement on a structural member subject to strain and during the normal curing process of the cement. A feature of this invention also resides in the fact that the form blocks may be readily separated or detached from the jig by the application of a solvent to the adhesive which secures the blocks to the jig.

Other objects and advantages of the invention will appear as the description proceeds. The features of this invention which are believed to be novel and patentable are recited in the claims which form a part of the specification. For a better understanding of the invention, reference is made in the following description to the accompanying drawings, in which:

Figure 1:
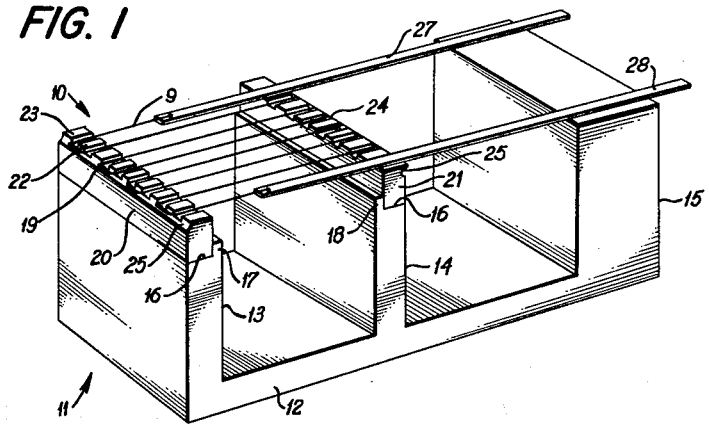
FIGURE 1 is a preferred form of gage made in accordance with the improved method of the present invention but shown prior to being affixed to a test structure subject to strain.
Figure 2:
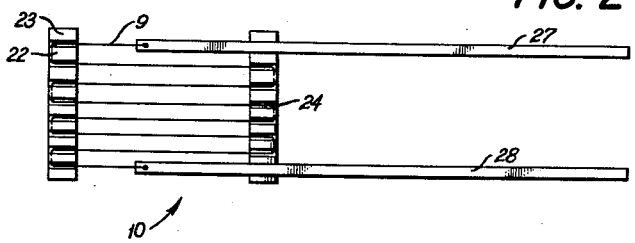
FIGURE 2 is an underside view of the gage of FIGURE 1 affixed to a test structure subject to strain.
Figure 3:
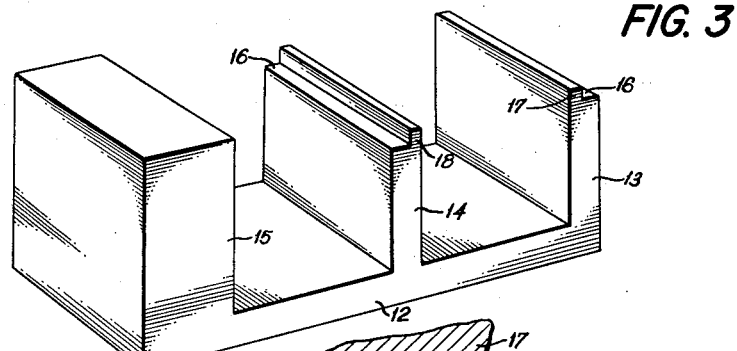
FIGURE 3 is a perspective view of the fixture or frame of the present invention shown in FIGURE 1 having been removed from form blocks upon which the strain gage wire grid is formed and ready for re-use.

Referring to the drawing, FIGURE 1 illustrates the formation of a filament 9 or grid of a strain gage 10 by the use of a jig or fixture represented by the general numeral 11. The jig 11 comprises a frame 12 having integral extending legs 13, 14 and 15, the jig may be formed from any suitable material but metal is preferred because of its rigidity so that no bending will occur between the legs. The frame may be constructed from a single block from which material is removed between certain portions so that these portions remain as legs or if more convenient, the frame may be made by bending sheet metal or by welding or otherwise affixing legs to a firm base. The legs 13 and 14 are reduced in height as compared to leg 15 and legs 13 and 14 and are provided with a lateral groove 16 across the free end of the extended portion of the legs which is defined by flanges 17 and 18 associated with free end of legs 13 and 14. It is to be noted that the frame may be constructed to have only legs 13 and 14 in a U-shaped configuration if desired.

Secured in groove 16 of both legs 13 and 14 by suitable means such as ethyl cellulose cement or "Duco" cement, there are provided form blocks 20 and 21 which provide an extension to the height of the legs to substantially achieve the same height as leg 15. The form blocks are suitably supported in grooves 16 adjacent flanges 17 and 18 of legs 13 and 14. It is to be noted that the flanges associated with the legs are facing each other with the grooves facing outwardly away from the flanges so that both flanges may be said to be between the pair of forming blocks.

Figure 4:
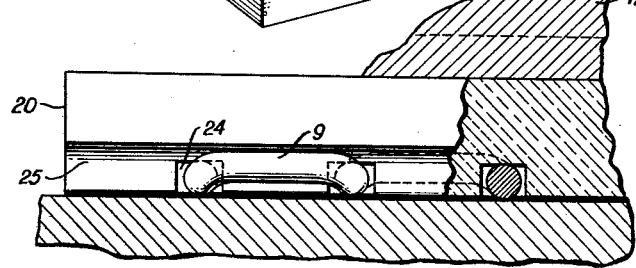
FIGURE 4 is an enlarged fragmentary view of a portion of the frame and form block showing the formation of the wire grid about the pins or projections of the form block.

The form blocks 20 and 21 are provided with a row 19 of small vertical pins or projections, such as projections 22 and 23, respectively, along their free and exposed end from the frame. Between the projections there is provided a space, such as space 24, suitable to accommodate the winding of a wire filament 9. However, it is to be noted that the depth of the groove or space between the projections, particularly as is shown in FIGURE 4, is more than the diameter of the filament or wire so that the filament will be above the surface of the test specimen to which it is assembled by means of cement. This accomplishes an insulation between the wire filament and the specimen to which it is assembled.

It has been found desirable in high temperature strain gage applications to form the form blocks from a high temperature material such as aluminum oxide-ceramic chips or other oxide combinations or cere-met (ceramic-metal oxide combination) materials. However, this arrangement is not limited to ceramics and may employ high temperature phenolics, plastics, synthetic plastics, or epoxy-resins. Form blocks 20 and 21 are provided with a lateral semicircular groove 25 which cuts through each projection and faces outwardly. Groove 25 is parallel to the longitudinal axis of the form block and is employed to receive the wire filament during fabrication of the gage and for holding the wire filament in place once the gage has been fabricated and during installation of the gage.

The electrically conductive filament 9 can be wound and supported on the form blocks mounted on the jig. One end of the filament may be laid in the first space or groove between projections 22 and 23 of form block 20, wrapped around projections 22 and extended to a space in the other form block 21 which is in line with the space 24. The end of the filament is held while the filament is then wound about successive projections within groove 25 of the two form blocks alternately, until all of the required projections on the form blocks have been employed so that a continuous metallic filament is provided which forms a series of substantially parallel lengths. The filament may then be wound several turns about the last projections to hold it in place or other suitable means such as cementing may be employed for securing the filament end. A short tail of wire may extend from the secured portion of the wire on the block for electrical connection directly in a bridge circuit or for connection with a lead ribbon. As the filament is being wound as described above, tension may be placed on the filament in order to provide a predetermined tautness in the wire grid between the form blocks. Considerable tension may be applied to the wire filament without dislodging the form blocks because of the form block being secured to legs 13 and 14 and the added support given by the flanges 17 and 18.

The filament may be a fine, high resistance wire, preferably approximately .0009" in diameter and may be made of an alloy of 85% platinum and 15% iridium or the alloy known commercially as "Nichrome V" (20% chromium and 80% nickel) and "Karma" (essentially 20% chromium, 73% nickel and minor amounts of aluminum and iron). Various other metals are suitable for this use, and the three alloys mentioned above are given as merely examples.

After the grid 9 has been formed on the forming blocks, the ends of the filament may be spot welded to a suitable metal ribbon such as ribbons 27 and 28. It has been found desirable to secure the ribbon to the wire end approximately midway between the forming blocks and free from the frame and form blocks so that welding equipment has easy access to achieve a good bond between the two elements.

The gage as formed above, can be readily sold for many applications and the gage is sold with the jig and form blocks attached as a unit. This allows for rugged handing and the entire structure can take abuse without damaging or affecting the strain gage element. The gage of the present invention may be employed in a transducer assembly such as a sting balance, strain multiplier and other tension and compression links.

When the gage is to be used upon a structure subject to strain, the surface to which the gage is to be attached should be thoroughly cleansed with a cleansing agent such as denatured alcohol or acetone for example. It has some times been found desirable to apply an undercoating of non-conductive cement to the clean surface a thickness of .001"-.003". One such cement is referred to in U.S. Patent 2,626,337 and consists of a powdered ceramic such as aluminum oxide mixed with sodium silicate. Various other ceramic type cements are suitable for this use in the low temperature range, and are generally available as standard low temperature ceramic cements. The cement undercoat should be allowed to air-dry and then cured for approximately thirty minutes at about 200° C. After the undercoat is cured or if no undercoat is employed, additional cement is applied to undercoat or to the cleaned surface of the test specimen and the strain gage is placed over the cement by manually holding the frame and pressing the strain gage, grid side down, on the cement and enough additional cement is applied to cover the wire of the strain gage. Care should be taken to insure that no cement comes in contact with the metal frame. The cement is again allowed to air-dry and is cured for approximately one hour at about 200° C.

For use in high temperature strain gage applications, it has been desirable to employ an adhesive or cement which is a heat curing epoxy resin composed of a liquid part and a brown powder part which are thoroughly mixed at room temperature until no lumps appear. Such a cement is manufactured by the Mithra Engineering Company, Box 472, Van Nuys, California. When used, the surface of the test specimen to be subjected to strain is cleansed as described above and the adhesive is applied to the clean surface followed by the placing of the gage grid down into the cement. A weight may be placed on the frame of the gage in the range of ¼ pound to ½ pound so that the grid and the form blocks become embedded in the wet cement. No cement or adhesive should come into contact with the frame. Curing of the adhesive may be at any convenient temperature from 200°–400° F. The higher the cure temperature employed, the shorter the time required. It is recommended that the temperature be cycled in order to remove any hysteresis effect that the cement might have. During this latter temperature curing, it is a feature of applicant's process that the adhesive which attaches the form blocks to the legs 13 and 14 of the frame becomes inactivated at high curing temperature and allows the frame to separate from the form blocks so that only the strain gage 10 and form blocks 20 and 21 remain cemented to the structure. For example, it has been found that the frame breaks away cleanly as 300° F. temperature disintegrates the cement holding the form blocks to the frame legs and thereby leaving the ceramic blocks and wire grid embedded in the cement. It is sometimes helpful in separating the blocks from the frame to exert pressure to the side of the frame. The frame 12 may now be fitted with another pair of form blocks on legs 13 and 14 and another filament 9 may be formed so that a strain gage may be fabricated.

In instances where less than 300° F. is employed for curing, separation of the form blocks from the frame may be accomplished by dissolving the cement holding the blocks to the frame by rubbing an acetone or methyl ethyl ketone or a similar ketone along the area where the blocks and the frame are secured.

It is now apparent that the invention provides an improved gage of the resistance wire type and a method of making the same that has various advantages over the gages and fabrication methods heretofore known. Because the gage made in accordance with the method of the present invention is not bonded in a mass of cement prior to its application to the surface subject strain, the thickness of the cement surrounding the gage may be held to a minimum and the binding of the gage to the surface improved, thereby improving the performance of the gage. Furthermore, resistance type electric strain gages constructed in accordance with the teachings of the invention may be used at temperatures ranging from room temperature up to approximately 2000° F., the range being determined only by limitations inherent in the filament or in the cement used to apply the filament to the structure subject to strain. During the application of the strain gage to the prepared surface of the structure subject to strain, the gage is constantly supported by the frame and at no time does a workman's fingers come in contact with the gage but only by means of the frame is the gage or filament properly placed in position. The detachment of the frame from the form blocks is more or less an automatic operation dependent only upon the increase of temperature to a point which permits free separation of the form blocks from the legs of the frame.

The unique construction of the invention permits easy and rapid installation, and the bare grid design makes this gage usable at extreme temperatures, both high and low. Also as no backing material or filler is used, the operation of removing the filler is eliminated. The adhesive used to apply the gage will act as insulator and bonding agent and also determine the maximum and minimum operating temperature. The ceramic form blocks act to decrease the cross sensitivity usually associated with strain gages. It will be found that an anchoring effect is present which tends to give better than average stability and sensitivity; the creep is lessened and the accuracy is increased. The metal frame is detached from the gage during installation.

Various modifications may be contemplated by those skilled in the art without departure from the spirit and scope of the invention as hereinafter defined by the appended claims.

We claim:

1. A strain gage assembly comprising, a frame for mounting the gage, a pair of form blocks bonded to the frame in fixed spaced relationship, adhesive detachably bonding the blocks to the frame so that separation of the blocks from the frame occurs at a selected time temperature, each form block of the pair having a plurality of projections evenly spaced apart, and a continuous metallic filament extending back and forth about preselected projections to form a series of substantially parallel lengths whose electrical resistance varies with its strain.

2. A strain gage assembly comprising, a frame for mounting the gage, a pair of form blocks bonded to the frame in fixed spaced relationship, solvent sensitive adhesive bonding the blocks to the frame so that separation of the blocks from the frame occurs at a predetermined time upon application of solvent to the adhesive, each form block of the pair having a plurality of projections evenly spaced apart, and a continuous metallic filament extending back and forth about preselected projections to form a series of substantially parallel lengths whose electrical resistance varies with its strain.

3. A strain gage assembly comprising, a frame for mounting the gage, a pair of form blocks bonded to the frame in fixed spaced relationship, thermal sensitive adhesive bonding the blocks to the frame so that separation of the blocks from the frame occurs at a predetermined temperature, each form block of the pair having a plurality of projections evenly spaced apart, and a continuous metallic filament extending back and forth about preselected projections to form a series of substantially parallel lengths whose electrical resistance varies with its strain.

4. A strain gage assembly comprising, a frame for supporting the gage, a pair of upright legs extending from the frame in parallel fixed spaced relationship, an elongated form block carried on each extended leg, temperature curing adhesive detachably bonding the blocks to the legs so that separation of the blocks from the legs occurs at a predetermined and selected time, each form block having a plurality of projections evenly spaced apart and having a lateral groove extending from one end of the form block to its opposite end across the projections, and a continuous metallic filament extending back and forth about preselected projections within the groove to form a series of substantially parallel lengths whose electrical resistance varies with its strain.

5. A strain gage assembly comprising, a frame for supporting the gage, a pair of upright legs extending from the frame in parallel fixed spaced relationship, an elongated form block carried by each extended leg, thermal sensitive adhesive detachably bonding the blocks to the legs so that separaiton of the blocks from the legs occurs at a predetermined temperature, each form block having a plurality of projections arranged side-by-side with a space between adjacent projections, and a continuous metallic filament extending back and forth about preselected projections to form a series of substantially parallel lengths whose electrical resistance varies with its strain, the diameter of the filament being less than the depth of the space between the projections so that the filament is recessed therein.

6. The method of manufacturing strain gages comprising the steps of: arranging a pair of form blocks in parallel fixed spaced relationship, bonding the blocks to a supporting frame with a thermal and solvent sensitive adhesive so that the form blocks may be selectively detached from the frame, winding a metallic filament about projections provided on the form block so that a continuous filament of substantially parallel lengths are provided, and securing the continuous filament to the form blocks by applying adhesive about the filament where the filament is wound about the projections.

7. The method of manufacturing strain gages comprising the steps of: arranging a pair of form blocks in parallel fixed spaced relationship, bonding the blocks to a supporting frame with a thermal sensitive and solvent activated adhesive so that separation of the form blocks from the frame occurs at a predetermined temperature or upon application of a solvent, winding a metallic filament about projections provided on the form block so that a continuous filament of substantially parallel lengths is provided, and securing the opposite ends of the continuous filament to the form blocks to maintain the filament taut.

8. The method of manufacturing a strain gage comprising the steps of: arranging a pair of forms having a plurality of projections in parallel fixed spaced relationship so that the projections of the forms are in alignment, bonding the forms to a supporting frame to maintain said fixed spaced relationship with a thermal and solvent sensitive adhesive so that separation of the forms from the frame occurs at a selected time, winding a metallic filament about the projections with a predetermined tautness so that a continuous filament of substantially parallel lengths is provided, and bonding each separate filament length to its associated projection to maintain filament tautness.

References Cited in the file of this patent

UNITED STATES PATENTS

| | | |
|---|---|---|
| 2,023,638 | Lawson | Dec. 10, 1935 |
| 2,344,647 | Simmons | Mar. 21, 1949 |
| 2,517,110 | Ingram | Aug. 1, 1950 |
| 2,548,592 | De Michele | Apr. 10, 1951 |
| 2,626,337 | Mitchell | Jan. 24, 1953 |
| 2,853,764 | De Michele | Sept. 30, 1958 |